(12) United States Patent
Kadu et al.

(10) Patent No.: US 12,136,140 B2
(45) Date of Patent: Nov. 5, 2024

(54) NOISE SYNTHESIS FOR DIGITAL IMAGES

(71) Applicant: DOLBY LABORATORIES LICENSING CORPORATION, San Francisco, CA (US)

(72) Inventors: Harshad Kadu, Santa Clara, CA (US); Bharath Vishwanath, San Jose, CA (US); Guan-Ming Su, Fremont, CA (US); Samir N. Hulyalkar, Los Gatos, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 54 days.

(21) Appl. No.: 17/786,906

(22) PCT Filed: Dec. 21, 2020

(86) PCT No.: PCT/US2020/066366
§ 371 (c)(1),
(2) Date: Jun. 17, 2022

(87) PCT Pub. No.: WO2021/127628
PCT Pub. Date: Jun. 24, 2021

(65) Prior Publication Data
US 2023/0050950 A1 Feb. 16, 2023

Related U.S. Application Data

(60) Provisional application No. 62/950,466, filed on Dec. 19, 2019.

(30) Foreign Application Priority Data

Dec. 19, 2019 (EP) ..................................... 19218144

(51) Int. Cl.
*G06T 9/00* (2006.01)
*G06T 11/00* (2006.01)
(Continued)

(52) U.S. Cl.
CPC ................ *G06T 11/00* (2013.01); *G06T 9/00* (2013.01); *G06T 9/007* (2013.01); *H04N 5/265* (2013.01); *G06T 11/60* (2013.01); *G06T 2210/52* (2013.01)

(58) Field of Classification Search
None
See application file for complete search history.

(56) References Cited

U.S. PATENT DOCUMENTS 7,889,939 B2   2/2011   Llach
7,889,940 B2   2/2011   Balram
(Continued)

FOREIGN PATENT DOCUMENTS

AU   2011213893 B2   10/2012
EP   3018906 B1   12/2018
(Continued)

OTHER PUBLICATIONS

Wikipedia: Box-Muller Transform (https://en.wikipedia.org/wiki/Box%E2%80%93Muller_transform.
(Continued)

*Primary Examiner* — Steven Z Elbinger

(57) ABSTRACT

Apparatus and methods for providing software and hardware based solutions to the problem of synthesizing noise for a digital image. According to one aspect, a probability image is generated and noise blocks are randomly placed at locations in the probability image where the locations have probability values that are compared to a threshold criterion,
(Continued)

creating a synthesized noise image. Embodiments include generating synthesized film grain images and synthesized digital camera noise images.

24 Claims, 13 Drawing Sheets

(51) Int. Cl.
*H04N 5/265* (2006.01)
*G06T 11/60* (2006.01)

(56) References Cited

U.S. PATENT DOCUMENTS

| | | | |
|---|---|---|---|
| 7,945,106 | B2 | 5/2011 | Gomila |
| 8,013,888 | B2 | 9/2011 | Schoner |
| 8,023,567 | B2 | 9/2011 | Gomila |
| 8,238,613 | B2 | 8/2012 | Boyce |
| 8,447,127 | B2 | 5/2013 | Gomila |
| 9,100,647 | B1 | 8/2015 | Balram |
| 9,438,821 | B1 | 9/2016 | Parker |
| 9,652,867 | B2 | 5/2017 | Webb |
| 2007/0058878 | A1* | 3/2007 | Gomilla ............ H04N 19/86 |
| | | | 375/E7.176 |
| 2008/0252781 | A1 | 10/2008 | De Waele |
| 2009/0231345 | A1 | 9/2009 | Bruls |
| 2014/0320692 | A1 | 10/2014 | Ichikawa |

FOREIGN PATENT DOCUMENTS

| | | |
|---|---|---|
| JP | 11085955 A | 3/1999 |
| JP | 2007504709 A | 3/2007 |
| JP | 2007513434 A | 5/2007 |
| WO | 2005034518 A1 | 4/2005 |

OTHER PUBLICATIONS

Wikipedia: Linear-feedback shift register (https://en.wikipedia.org/wiki/Linear-feedback_shift_register).

Wikipedia: Marsaglia Polar Method (https://en.wikipedia.org/wiki/Marsaglia_polar_method).

\* cited by examiner

NOISE SYNTHESIS FOR DIGITAL IMAGES

CROSS-REFERENCE TO RELATED APPLICATIONS

This application claims the benefit of priority from U.S. Provisional Patent Application No. 62/950,466, filed on 19 Dec. 2019, and EP Patent Application No. 19218144.4, filed on 19 Dec. 2019, which are hereby incorporated by reference in their entirety.

TECHNICAL FIELD

The present disclosure relates generally to images. More particularly, an embodiment of the present disclosure relates to synthesizing film grain and camera noise for images.

BACKGROUND

As used herein, the term noise synthesis refers to the generating noise effects for a digital image (including video frame) by means other than how that noise would normally occur. Unless a particular sense is explicitly specified to have particular significance at any point in the description herein, it should be inferred that the term may be used in either sense, e.g. interchangeably.

The photographic film strip was the canvas for traditional photography before the advent of digital technology. This film is a thin plastic sheet covered with light sensitive material (for example, silver halide) to absorb the light emanated from or reflected off objects to be filmed. After processing these films, the captured light can be transformed into an image. As used herein, "film grain" refers to a visual texture developed in the processed image due to dye clouds (or silver particles) receiving enough photons. It is an optical phenomenon caused by chemical processes going on during the processing of the film and depends upon both the definition the film is observed at, and the type of film stock used.

Digital photography is inherently devoid of the film grain effect. But for artistic and quality reasons, it is still desired. For example, Hollywood studios prefer the movie content to have film grain. For digital images, film grain pattern has to be synthesized and overlaid on the image during post-processing.

"Camera noise" refers to variations of brightness and/or color (colored specks on the image) in a digital image due to the electronics of the camera, such as sensor size, exposure times, ISO settings, or the like. Typically, camera noise is removed from digital images by varying techniques in order to avoid problems in compression, but in some cases camera noise is desired to have an image keep the original "look" it had when captured.

As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

In practice, digital images comprise one or more color components (e.g., luma Y and chroma Cb and Cr) wherein each color component is represented by a precision of n-bits per pixel (e.g., n=8). Using linear luminance coding, images where n<8 (e.g., color 24-bit JPEG images) are considered images of standard dynamic range (SDR), while images where n>8 may be considered images of enhanced dynamic range (EDR). EDR and high dynamic range (HDR) images may also be stored and distributed using high-precision (e.g., 16-bit) floating-point formats, such as the OpenEXR file format developed by Industrial Light and Magic.

As used herein, the term "noise synthesis" includes, but is not limited to, synthesizing the noise normally caused by film/video/image capture or development, such as film grain or camera noise, in a digital image. The term can also refer to any artificially inserted noise into a digital image, for any purpose.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not be assumed to have been recognized in any prior art on the basis of this section, unless otherwise indicated.

SUMMARY

Apparatus and methods according to the present disclosure provide solutions to the problem of synthesizing noise for a digital image. According to an embodiment of the present disclosure, synthesized film grain is added to a clean (i.e. noise free) digital sequence.

The process of synthesizing noise as presented herein has numerous advantages in image transmission and display. For example, the ability to synthesize noise post-transmission allows the transmission of a noise-free compressed image, which can provide increased transmission efficiency (data speed, bandwidth, etc.). The addition of synthesized noise to the uncompressed image can reduce the effect of compression artifacts in the displayed image. The use of noise blocks allows for control of film grain size, sharpness, and type (noise source emulation), and their random placement in the image prevents the blocking artifacts that would be caused by tiled placement. Additionally, for a hardware-based implementation, the use of per-line processing allows for a resource efficient implantation of noise synthesis.

According to a first aspect of the present disclosure, a computer-based method for creating a synthesized noise image for a digital image is disclosed, the method comprising: providing a plurality of noise block patterns; initializing a noise image; generating a probability image comprising randomly generated probability values at each pixel of the probability image, comparing each probability value in the probability image with a threshold criterion; if the probability value satisfies the threshold criterion, selecting a noise block pattern from the plurality of noise block patterns, the noise block pattern having an anchor point; and if the probability value satisfies the threshold criterion, creating synthesized noise image by placing the noise block pattern in the noise image such that the anchor point corresponds to a pixel in the probability image that meets the threshold criterion.

The noise grain block patterns can be selected randomly. The probability values of the probability image can be uniformly distributed probability values. The noise block patterns can comprise film grain block patterns. The method can also include aggregating values in regions of the noise image where the noise block patterns overlap. The method can include generating the noise block patterns before generating the noise image, wherein the noise block patterns are generated through an inverse DCT technique. This generating can include removing low frequency DCT coefficients and/or removing high frequency DCT coefficients. The probability image and the noise image can be sized to match a video frame. The method can include editing a content image by adding the noise image to a channel of the content image. The method can include multiplying values in the noise image by a modulation factor before adding the noise image to the content image. The values can be luma intensity values of the noise image. The method can include generating a YUV content image based on the edited content image. The method can include generating an RGB content image based on the YUV content image. The method can be run on a computer program product comprising data encoded to perform the method.

The method can be run by a noise synthesis module to create a synthesized noise image for a device. The device can include a decoder decoding an encoded image, creating a decoded clean sequence, wherein the decoder is configured to combine the synthesized noise image with the decoded clean sequence, creating a rendered image for display. The device can include a modulation curve module for modulating the synthesized noise image prior to combining with the decoded clean sequence.

According to a second aspect of the present disclosure, a device for creating synthesized noise in an image, the device comprising: a line buffer comprising a row from the image; firmware comprising noise block patterns; a pseudo random number generator providing a random value for a pixel in the row; logic for comparing the random value with a threshold criterion; NBMT data store comprising a noise block management table; logic populating the noise block management table based on a random noise block pattern from the firmware being associated with a pixel in the row where the random value associated with the pixel meets the threshold criterion; logic computing a noise value for each pixel location in the row of the image based on the noise block management table; and logic modifying the row based on the noise value.

The device can include logic for determining a modulation curve from the image, computing a modulation factor, and applying the modulation factor to the noise value prior to modifying the row. The pseudo random noise generator can generate random numbers based on the row index and a random offset value. The image can be a luma channel image or a chroma channel image. The device can include multiple pseudo random number generators and multiple line buffers processing the image in parallel.

According to a third aspect of the present disclosure, a method for generating metadata for a decoder, the method comprising: setting a noise category parameter; setting a block size parameter; setting a threshold parameter; and setting a modulation factor curve parameter.

The method for generating metadata can include setting a noise variance parameter, setting a number of block patterns parameter, and/or setting a noise block management table entries parameter.

DEFINITIONS

Throughout the present disclosure, probability image is defined as a digital image made from random values.

Noise refers to a random variation of brightness (luma) and/or color (chroma) information in a digital image caused by an effect other than the environment being imaged.

Film grain refers to a random optical texture on an image, such as would be caused by film processing. Film grain is a noise in the luma channel.

Grain size refers to the average diameter of the individual grains of the film grain.

Camera noise refers to a random optical texture on an image, such as would be caused by digital camera hardware. Camera noise is a noise in both the luma and chroma channels.

Camera noise, non-synthesized, arises from a number of sources including sensor size, thermal effects, long exposure times, high ISO settings, etc.

DCT refers to discrete cosine transform, and IDCT refers to an inverse discrete cosine transform.

Digital image refers to an image, or a frame of a video, that is numerically represented.

DETAILED DESCRIPTION

Systems and methods for synthesizing noise, such as film grain or camera noise, onto a digital image (including video) is described herein. In the following description, for the purposes of explanation, numerous specific details are set forth in order to provide a thorough understanding of the present disclosure. It will be apparent, however, that the presently claimed subject matter may be practiced without these specific details. In other instances, well-known structures and devices are not described in exhaustive detail, in order to avoid unnecessary occluding, obscuring, obfuscating the present disclosure.

Figure 1:
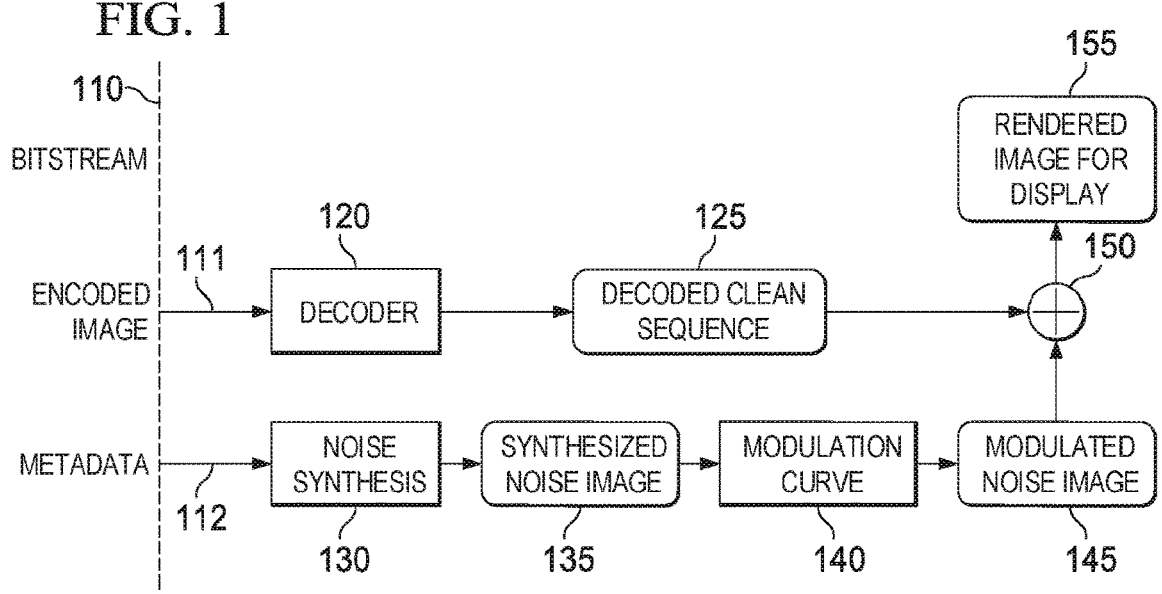
FIG. 1 depicts, according to an embodiment, an example decoder system including a noise synthesis module.

FIG. 1 depicts an example architecture for a decoder implementing noise synthesis. A bitstream (110) sending an encoded image (111) with its corresponding metadata (112) is received by the system. A decoder (120) decodes the image into a decoded clean sequence (125). Since the encoded image (111) was produced by an image that was cleaned of any noise pre-encoding, the decoded clean sequence (125) is also (mostly) noise-free. The metadata (112) provides parameters to the noise synthesis module (130) and, optionally, to the modulation curve module (140). The noise synthesis module (130) uses the metadata (112) to create a synthesized noise image (135). This synthesized noise image (135) can be run through a modulation curve module (140) to produce a modulated noise image (145). The decoded clean sequence (125) and the modulated noise image (145) (or synthesized noise image (135) if no modulation is performed) are combined (150) in one or more channels to produce the rendered image for display (155) or for color conversion prior to display.

The noise synthesis does not need to be tied to a decoder. For example, a video producer can use noise synthesis for video production pre-release. For the case of non-decoder implementation, the decoded clean sequence (125) can be replaced with a content image to be edited. For example, a noise image can be synthesized by a colorist, then later modulated before adding it to a content image.

The noise can be in the luma channel, the chroma channel, or both, depending on the desired effect. For example, for emulating film grain, the noise could just be in the luma channel. To emulate the noise induced by digital camera hardware, the noise could be in the luma and chroma channels. Various types of noise emulation are possible by adjusting the metadata parameters appropriately.

Noise for digital images can be synthesized by a process of adding noise block patterns to the images through a probability image. The concept is to add block patterns on a pixel-by-pixel basis, rather than dividing the original image up into blocks.

Figure 2A:
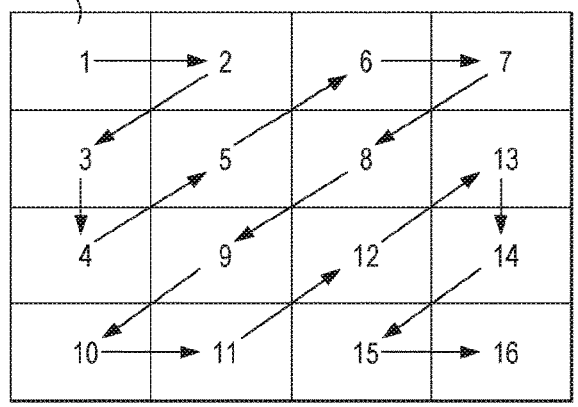
FIGS. 2A and 2B illustrate, according to an embodiment, an exemplary DCT matrix for generating a film grain block pattern.

In order to synthesize a film grain block pattern of size B×B, start with a B×B matrix M of standard normal random numbers (e.g. B=4, 8, etc.). Matrix M represents 2D DCT coefficients with the top left being the DC (frequency=0) coefficient and bottom right being the highest frequency AC (frequency>0) coefficient. The DC coefficient is labelled 1 (210) and the labels increase in a zigzag order as shown in FIG. 2A for a 4×4 block example.

Figure 2B:
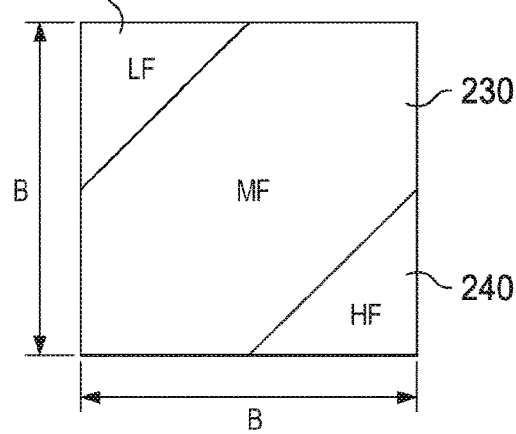

These frequency coefficients can be broadly classified into three bands, namely, low, mid and high, as shown in FIG. 2B. Mid-frequency band (230) in M is preserved, while the low (220) and high (240) frequency components are removed (or, alternatively, only the low frequency components (220) or component is removed). For example, in a 4×4 block the frequency coefficients labelled 4 to 10 could be preserved and coefficients 1-3 and 11-16 could be removed. The range of frequency coefficients that can be preserved is customizable, with at least coefficient 1 being removed.

Let $M_{mid}$ represent the matrix M with only mid-frequency coefficients preserved and low/high coefficients set to zeros. The film grain block $G_{raw}$ can be constructed by taking inverse DCT of $M_{mid}$ as shown in equation 1.

$$G_{raw} = iDCT(M_{mid}) \qquad \text{equation 1}$$

The block is normalized by dividing each element by the energy E and then it is scaled to desired multiplier V as shown in equation 2.

$$V = \frac{\sigma_n^2}{B \times Th_{norm}} \qquad \text{equation 2}$$

$Th_{norm}$ is a threshold value normalized to the interval [0, 1). An example value for $Th_{norm}$ is 0.1. $\sigma_n^2$ is the noise variance. The noise variance is a tunable parameter. An example range for 16 bit images can be 1000 to 6000.

Rounding is performed towards the end to get rid of any fractional parts as shown in equation 3.

$$G = \text{round}\left(G_{raw} \times \frac{V}{E}\right), \text{ where } E = sqrt\left(\sum_{i,j=0}^{B-1} G_{raw}(i,j)^2\right) \qquad \text{equation 3}$$

The pseudocode for computing the film grain matrix G is outlined below. The function zigzag( ) gives out the frequency label at each location in the matrix. The range of frequency coefficients to be preserved is $[f_s, f_e]$.

$$M_{mid} = 0_{B \times B}$$

$$i = 0 \to B - 1$$

$$j = 0 \to B - 1$$

$$M(i, j) = m_{ij}, \text{ where } m_{ij} \sim N(0, 1)$$

$$\Omega = \{i, j | \text{zigzag}(i, j) \in [f_s, f_e]\}$$

For each pair $i, j \in \Omega$ $$M_{mid}(i, j) = M(i, j)$$

$$G_{raw} = iDCT(M_{mid})$$

$$E = sqrt\left(\sum_{i,j=0}^{B-1} G_{raw}(i, j)^2\right)$$

$$i = 0 \to B - 1$$

$$j = 0 \to B - 1$$

$$G(i; j) = \text{round}\left(\frac{G_{raw}(i, j) \times V}{E}\right)$$

Multiple noise patterns with different block dimensions can be constructed to be used later for putting together the synthesized noise image. 4×4, 8×8, 16×16 and 32×32 are some typical block sizes. Size of the film grain can be changed by modifying the frequency range. If the proportion of frequency coefficients closer to the LF region is significant in the frequency range $[f_s, f_e]$, the grain size will be larger. On the contrary, if the portion of frequency coefficients closer to the HF region is significant, then it will produce smaller grains. For an 8×8 block example, the frequency coefficients range [4-10] will produce larger grains compared to [4-36].

Several noise blocks having different sizes can be pre-computed and stored in block patterns dataset G̃. This database can be viewed as a 3D matrix with Q number of 2D noise blocks stacked one after the other. If L×L is the maximum size of the film grain block, then dimension of $\tilde{G}$ is L×L×Q. A vector S having Q elements can be maintained to store the corresponding size of each block in the pattern dataset, i.e. $S(i) \leq L$ for $i \in [0, Q-1]$.

Figure 3:
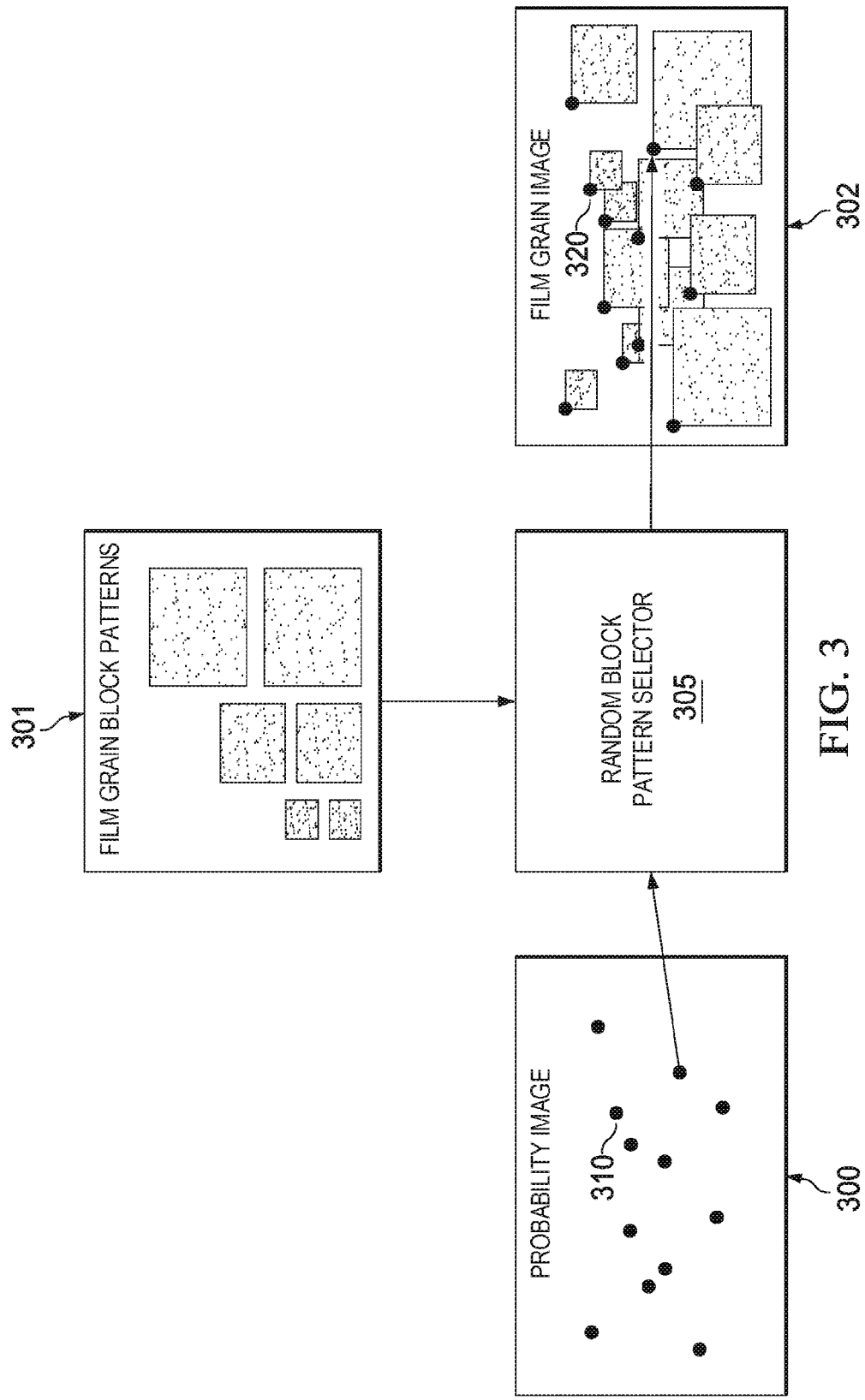
FIG. 3 depicts, according to an embodiment, an example decoder system utilizing synthesized noise generation.

FIG. 3 shows an example of constructing a synthesized noise image. In this example, the noise simulates film grain. To construct a synthesized noise image (302) of dimension H×W from the block patterns (301), start with a probability image (300) of the same size. Typical noise images for film grain are FHD (full high definition, e.g. 1080p), UHD (ultra-high definition, e.g. 4K), and 8K resolution. A probability image is a matrix having uniform random numbers, for example in the interval [0,1). A threshold Th*norm* (e.g. 0.1) is selected and every entry in the probability image (300) is compared against the threshold. In FIG. 3, the circles (310) denote the locations having probability less than the threshold. Alternatively, the locations could be selected at pixels having probability greater than, less than or equal, or greater than or equal to the threshold. Basically, there is a criterion of comparing the probability value at a given pixel with the threshold value. For simplicity, only a few locations are shown, but an actual probability image might have many more locations. Noise blocks are placed at the circles. These locations are denoted by set $\Psi$.

The noise blocks can be placed such that the location in the probability image is in the upper left-hand corner (320) of the noise block, as shown in FIG. 3. Alternatively, the location can be set at the center, other corner, or any specified location related to the noise block. The point at which the noise block corresponds to location is the "anchor point" of the noise block, and can be the same for all noise blocks.

A block pattern selector (305) will randomly pick a film grain block pattern to be inserted at the location in set T. This block selector can be a uniform random number generator. After the blocks are placed at appropriate locations, there is a possibility that these blocks might overlap as shown in FIG. 3. The cells from the collocated cells in the overlapping blocks are added together. This aggregate value goes into the output noise image (302). As the overlap regions are aggregated instead of averaged, one can scale the film grain blocks by multiplier V, instead of noise variance $\sigma_n^2$ (see equation 2). This prevents the aggregate noise pixel value from becoming too large.

In order to synthesize the film grain image I, consider the block pattern dataset $\tilde{G}$. At every location in the set $\Psi$, a block can be randomly picked from the dataset to be inserted into the film grain image. Let r be the index of that randomly selected block for the current location, where r~Uniform[0, Q−1]. The dimension of this block G' is S(r)×S(r), such that, G'=$\tilde{G}$(0: S(r)−1,0: S(r)−1, r). A different random number r can be selected every time there is a new block to be inserted at the current location. Pseudocode for this can be shown as:

$I = 0_{H \times W}$ $i = 0 \rightarrow H-1$ $j = 0 \rightarrow W-1$ $P(i,j) = p_{i,j}$, where $p_{i,j} \in [0, 1)$ $\Psi = \{i,j | P(i,j) < Th_{norm}\}$ For each pair i,j in $\Psi$ $I(i{:}i{+}S(r){-}1, j{:}j{+}S(r){-}1) = I(i{:}i{+}S(r){-}1, j{:}j{+}S(r){-}1) + G'$ G' denotes the random block selected for the location i,j based on the random number r. In other words, for each location i,j a random number r is selected, then a $G^r$ is generated as a function of r.

For the case of synthesizing film grain or similar noise, the noise can be quite annoying and intrusive in the bright regions of the image. The intensity based luma modulation curve reduces the strength of noise in these bright regions, making film grain infused images more desirable to the viewer. Film grain images are generated beforehand, as described in the previous sections. These images are then modulated based on collocated luma intensity and added to the luma channel.

Figure 4:
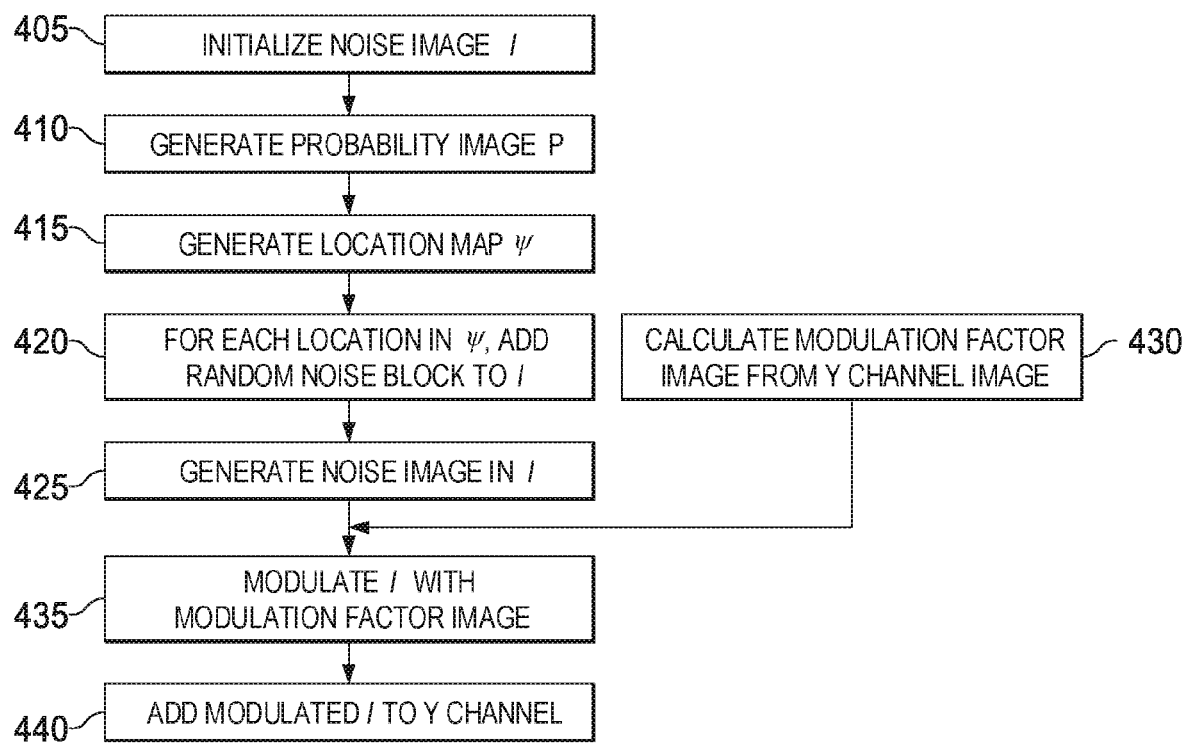
FIG. 4 depicts, according to an embodiment, an example flowchart for a process of adding noise to the luma channel for an image.

FIG. 4 shows, for an embodiment and not by way of limitation, a general method for adding noise to the luma channel (e.g. Y channel) for an image. First, a noise image I is initialized (405). The noise image can have the same dimensions as the Y channel image. The initialization can set all the pixel values of the noise image to 0, or some other set value. Next, a probability image P is generated (410), where random values are generated at each location in P. The probability image can have the same dimensions as the noise image. The random values can range from 0 to 1, or between any two values. Then a location map $\Psi$ is generated (415) by comparing each probability value in P for each pixel location against a threshold criterion (for example, being less than or equal to a set threshold value). For each location identified as meeting the threshold criterion in $\Psi$, a randomly selected noise block is added to the corresponding pixel location in I. If the block is greater than 1×1, the block can be given an anchor point (for example, the upper left corner pixel of the block) where the block will be anchored to the corresponding pixel location in I. When all identified locations in $\Psi$ have been processed, the aggregate of the added noise blocks forms a synthesized noise image in I (425). The synthesized noise image can be modulated by a modulation factor (435) which can be calculated from the luma channel (430). The modulated synthesized noise image can then be added to the luma channel (440) for the image.

Figure 5:
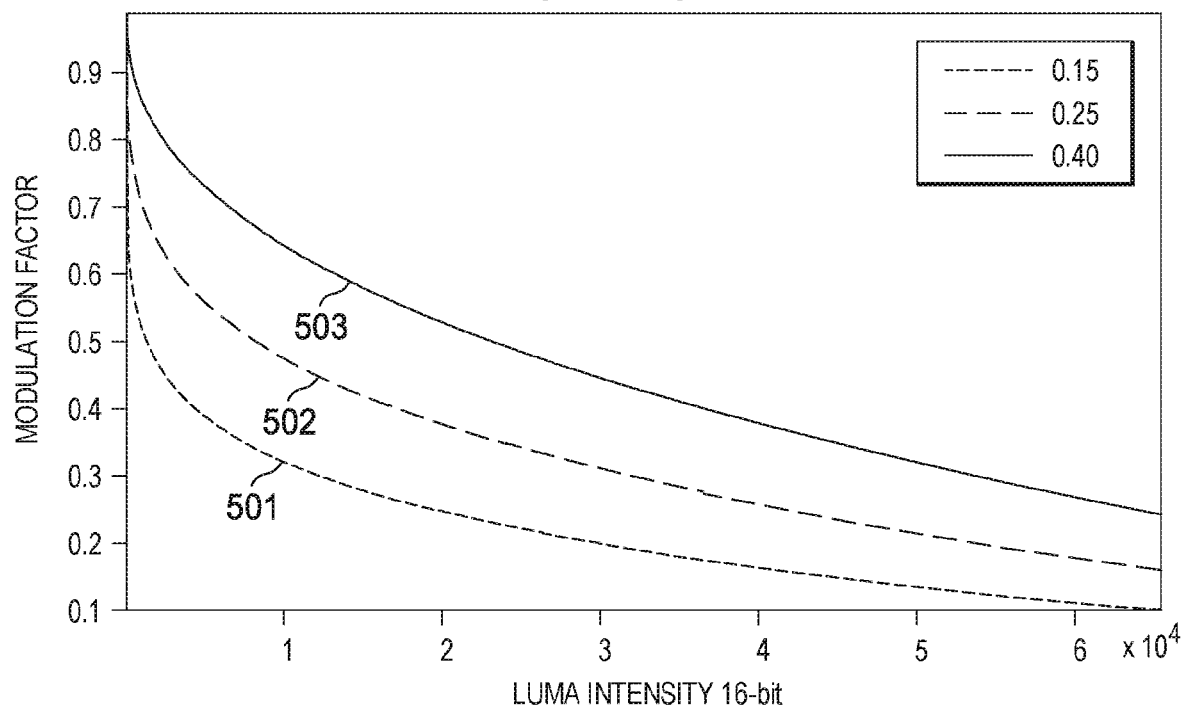
FIG. 5 shows, according to an embodiment, an example of luma modulation curves with a fixed alpha.
Figure 6:
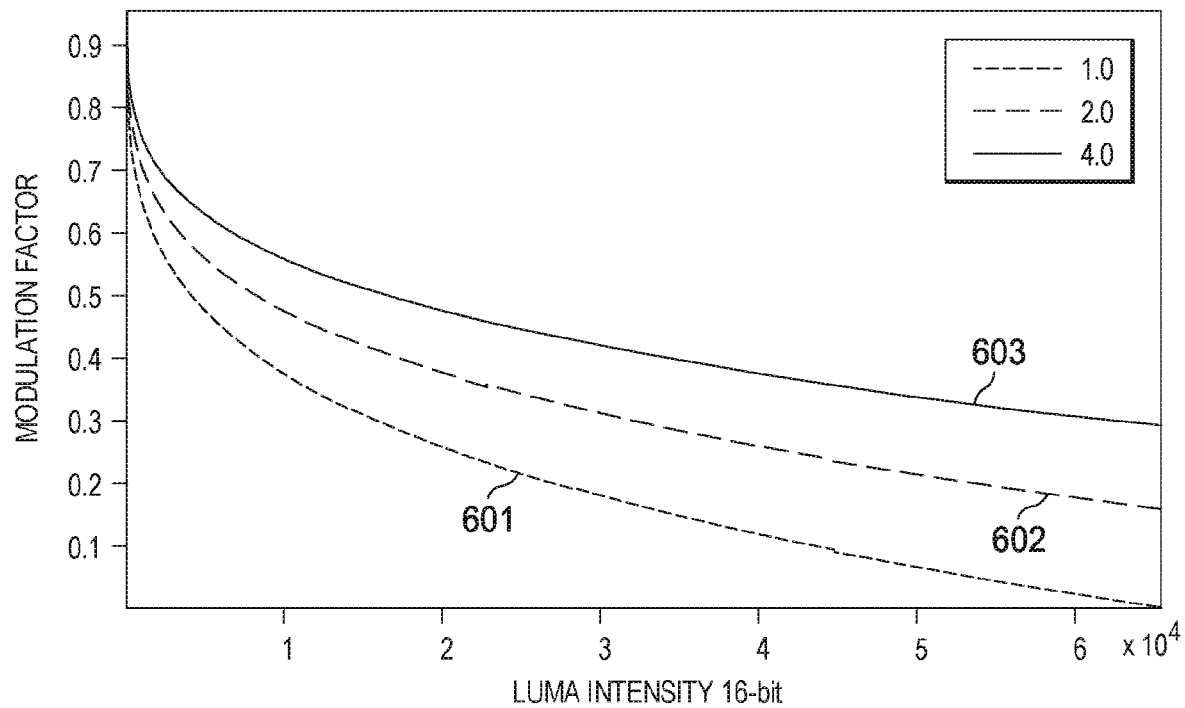
FIG. 6 shows, according to an embodiment, an example of luma modulation curves with a fixed beta.

Sample luma modulation curves are shown in FIG. 5 and FIG. 6. These graphs give the modulating factor for different values of luma intensities. The modulation factor is a rational number in the range (0, 1]. In some embodiments, with no limitation, the factor is close to unity for low intensity codewords and reduces as the intensity increases. Before adding a film grain pixel to the collocated pixel in the luma channel, the system can multiply the film grain value by its modulation factor. The modulation factor is derived from collocated luma intensity value and the modulation curve. Due to the decaying trend of the curve, film grain intensity is reduced when for the bright region in the image.

Suppose the intensity value of luma channel be denoted by l in $B_t$-bit codeword range. As an example, with no limitation, a modulation factor curve f(•) can be calculated as shown in equation 4.

$$f(l) = 1 - \left(\frac{l/\beta}{2^{B_t}}\right)^\alpha \text{ for } 0 \leq l \leq 2^{B_t} - 1 \qquad \text{equation 4}$$

In equation 4, $\alpha$ and $\beta$ denote the curve parameters.

FIG. 5 shows an example of luma modulation curves for varying $\alpha$ and $\beta=2$ ($B_t=16$). Curves are shown for $\alpha=0.15$ (501), 0.25 (502), and 0.4 (503).

FIG. 6 shows an example of luma modulation curves for α=0.25 and varying (B$_r$=16). Curves are shown for β=1.0 (601), 2.0 (602), and 4.0 (603).

The liberty to choose α or β makes it possible to use the same equation for different Electro-Optical Transfer Functions (EOTFs).

If $Y(i,j)=y_{ij}$ is the luma intensity at location (i,j) in the Y channel image, then noise value at location (i,j) in the noise image can be multiplied by $f(y_{ij})$ and added to the luma channel to get the noise infused luma value $\hat{Y}(i,j)=Y(i,j)+I(i,j)\times f(y_{ij})$.

Figure 7:
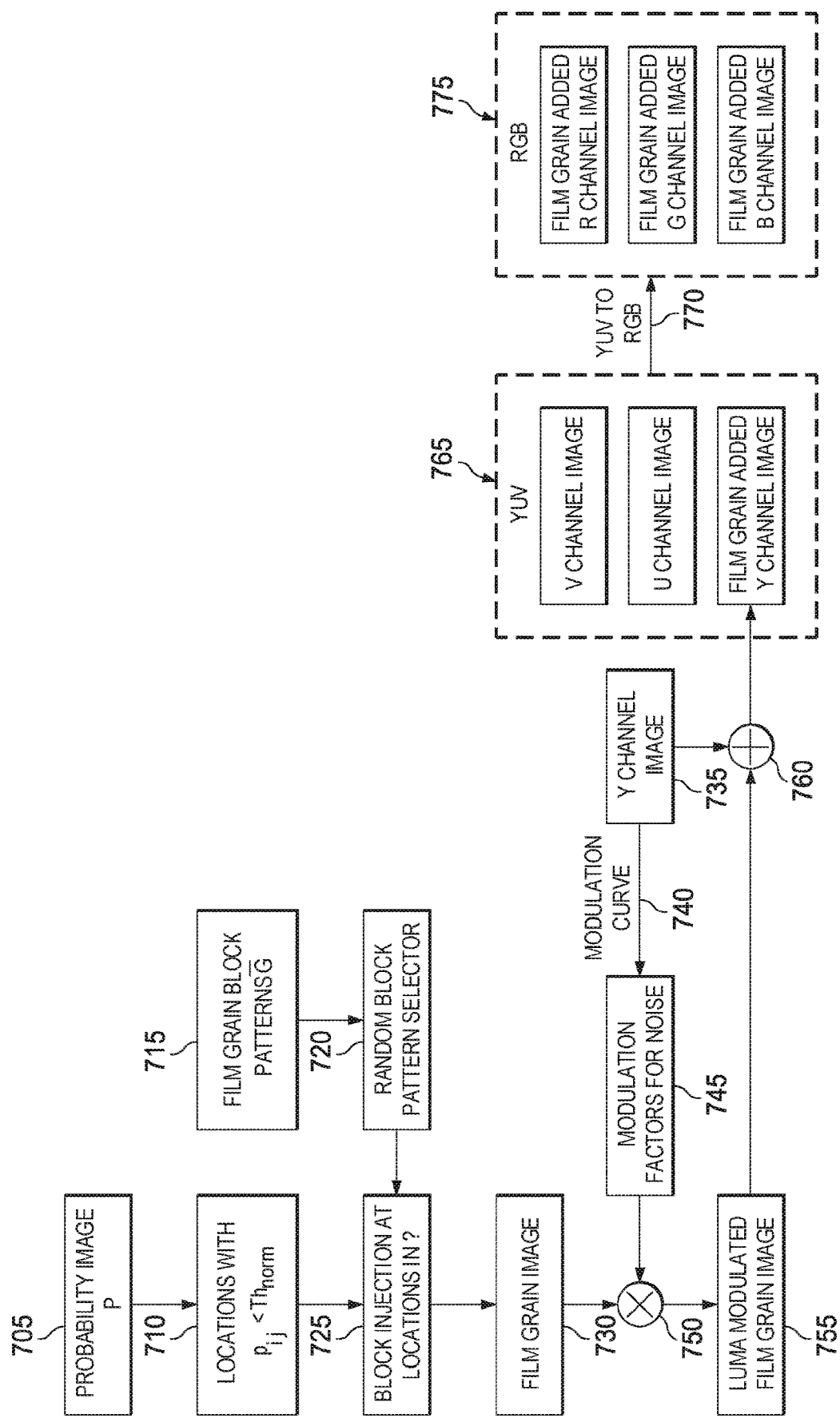
FIG. 7 shows, according to an embodiment, an example of film grain synthesis with color conversion.

FIG. 7 shows an example of film grain synthesis with color conversion. A probability image (705) is created and locations are selected (710) by comparing the values at each pixel of the probability image (705) with a threshold value, in this example the locations being those pixels having values below the threshold. A set of film grain patterns (715) are pre-generated and blocks are randomly selected (720) to be injected into the probability image (725), creating a film grain image (730). The Y (luma) channel of the image (735) is modulated (740) to create an image with modulation factors for the noise (745). The film grain image (730) and the modulation factors image (745) are combined (750) to produce the luma modulated film grain image (755). The luma modulated film grain image (755) is combined (760) with the Y channel image (735) to produce a film grain added Y channel image (765). The YUV images, including the film grain added Y channel, can be color converted (770) to produce an RGB image with film grain noise added for all channels (775).

Digital camera noise can be synthesized using Gaussian random numbers. The random numbers can be generated, for example, from uniform random numbers using a Box Muller Transform or a Marsaglia Polar Method.

For the Marsaglia Polar Method for generating the Gaussian random number from uniform random numbers, suppose $u_1$ and $u_2$ are two uniform random numbers selected from the range [0,1]. If the condition $0<u_1^2+u_2^2<1$ is satisfied, then the number $$u_1 \times \sqrt{\frac{-2\times\log(u_1^2+u_2^2)}{u_1^2+u_2^2}}$$

is Gaussian random number with zero mean and unit standard deviation. Care should be taken to avoid allowing the process from looping too long before the condition is satisfied.

As digital camera noise can be simulated with Gaussian random numbers, synthesizing the camera noise image boils down to generating a 2D matrix having the dimension of the image and containing Gaussian random numbers with zero mean. The noise image is modulated with luma intensity as discussed previously. The noise image can then be added to the Y, U and V channels of the content followed, optionally, by color space conversion (for example, to RGB).

Figure 8:
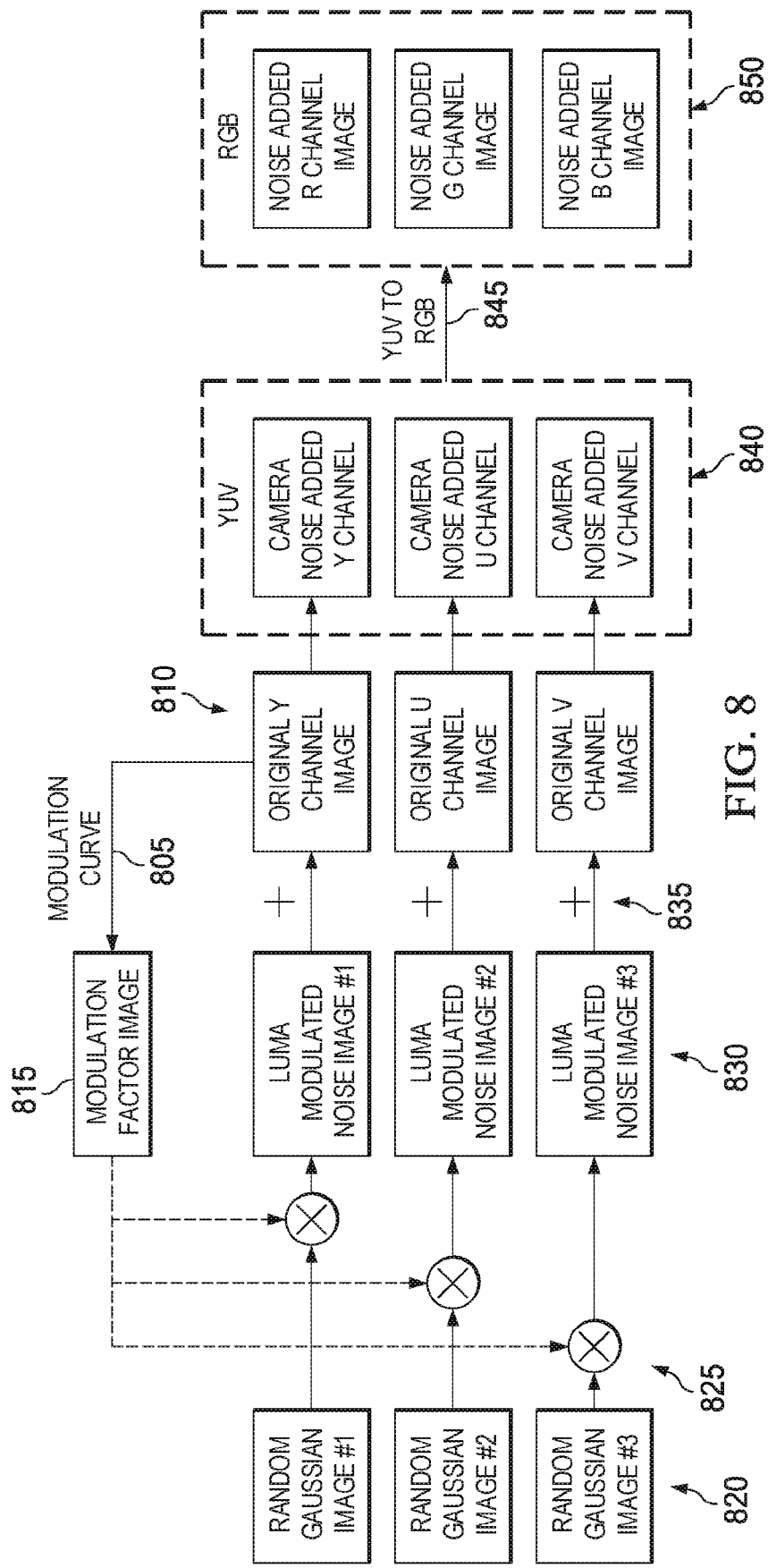
FIG. 8 shows, according to an embodiment, an example of camera noise synthesis with color conversion.

FIG. 8 shows an example of camera noise synthesis with color conversion. This is a further embodiment of noise synthesis and so features common to both embodiments may be omitted from the description, but should be understood to still be common to both. The Y (luma) channel of the image (810) is modulated (805) to produce a modulation factor image ("MFI", 815). Three random Gaussian images ("RGI", 820), one for each channel, are produced and, with the modulation factor image (815), produce three luma modulated noise images (830). These noise images (830) are added (835) to their respective channels (840) in the original image. These channels (840) can then be converted (845) to a different color encoding scheme (850), such as RGB. A luma modulated noise image (830) represents a pixel by pixel multiplication (825) of an MFI image (815) with the RGI image (820) for the corresponding channel.

When implementing noise synthesis in a hardware, as opposed to software, solution, four factors should be taken into account for optimization.

1. In the software implementation, the noise image is synthesized separately and then added to the luma channel. Due to the memory limitations in the hardware, only a pixel of film grain image is computed and added directly to the luma channel of the content. This approach gets rid of any intermediate memory buffer to store the entire film grain image and saves significant amount of on-chip memory.
2. In the hardware implementation, the image is accessed through line buffers. A line buffer can store a row of the image. As hardware memory is expensive, the number of line buffers is typically limited, so the entire image cannot be loaded into these few line buffers. Reading and writing to the memory is also time consuming. For this reason, the hardware solution should read a row of the image into the line buffers once, do the entire processing, and then write out the result to the memory only once. Multiple reads and writes of the same parts of the image into the line buffers is sub-optimal.
3. Floating point representation is not hardware friendly, so the values are more efficiently dealt with when in integer format for the hardware implementation. Noise block patterns, image pixels, thresholds, etc. can be represented in integer format to allow for a simpler hardware implementation. For example, instead of having probabilities set from 0 to 1 (real), they can be set from 0 to 255 (integer).
4. The block size in the hardware implementation is fixed (e.g. all blocks are 8×8) for consistency across all the decoder hardware chips. For the rest of the description, the fixed block size will be represented by B×B.

To optimize the system for a hardware implementation, the noise synthesis algorithm can be adjusted to take these factors into account.

Figure 9:
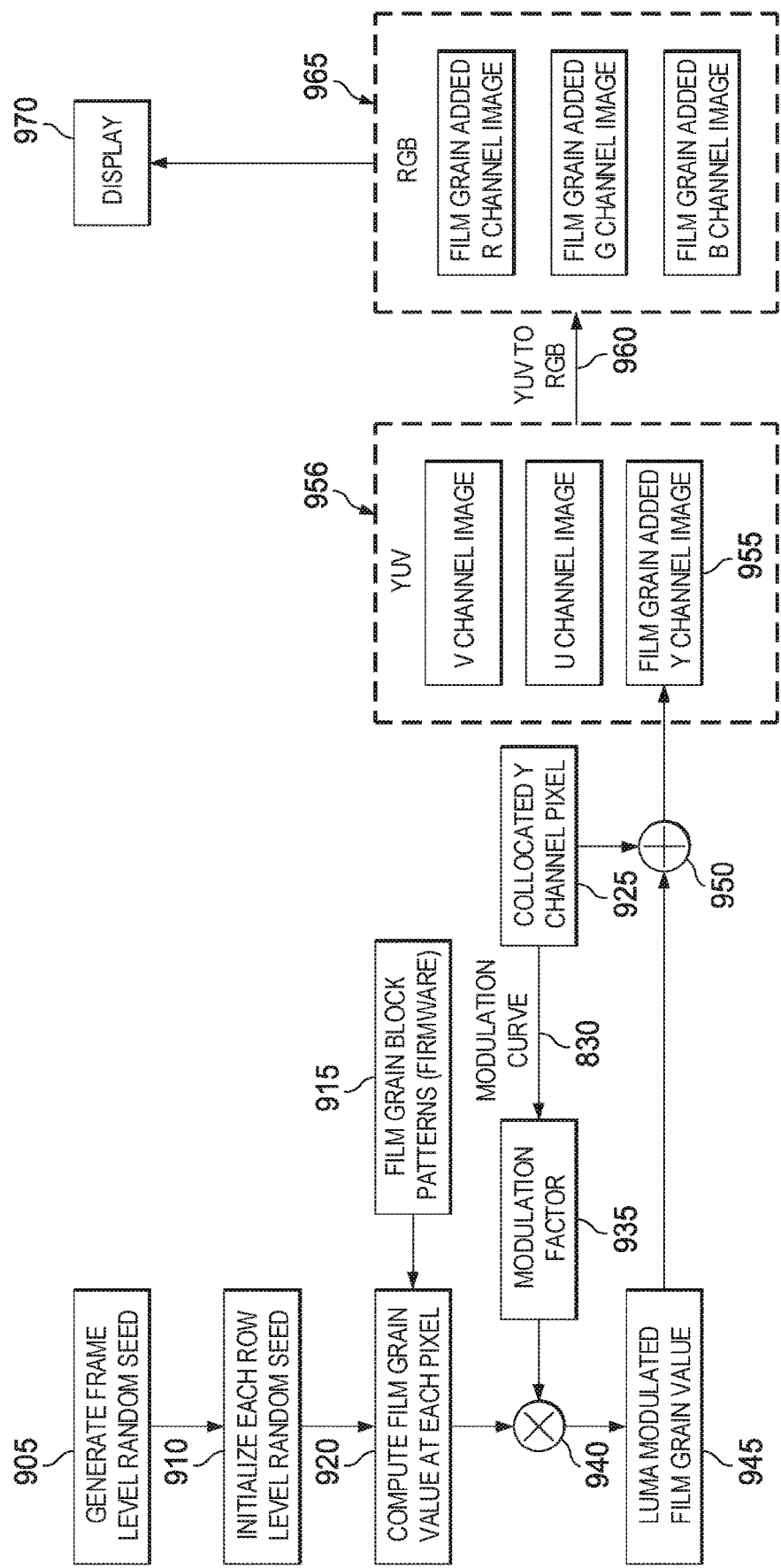
FIG. 9 shows, according to an embodiment, an example block diagram for generating synthesized film grain infused content through hardware.

FIG. 9 shows an example block diagram for generating noise, in this case film grain, infused content through hardware. Film grain (945) is added onto the Y (luma) channel (955) only, but other noise infusion techniques might include the V and U channels as well. The processor clock (timestamp/date/time-of-day/etc.) can be utilized as the frame level random seed (905). This random seed is used to initialize all the row level pseudo random number generators (910). Each pixel is evaluated in terms of film grain (920) and then added (940) to the luma channel (925) of the content after modulation (930, 935). Film grain added content (956) is eventually converted (960) to RGB (965) for display (970).

Figure 10:
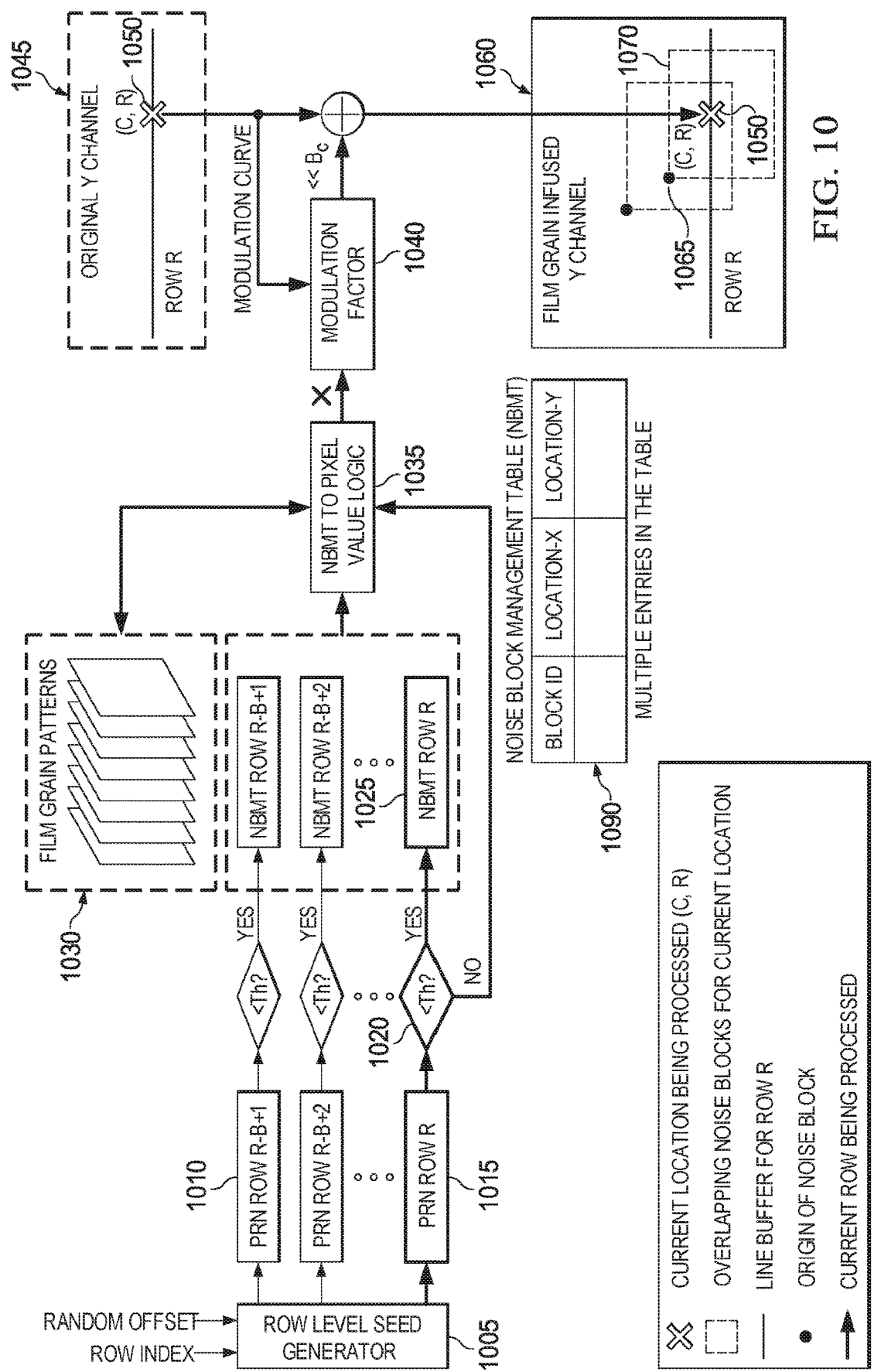
FIG. 10 shows, according to an embodiment, an example of how each pixel of an image can be evaluated in terms of film grain in hardware.

FIG. 10 shows an example of how each pixel can be evaluated in terms of film grain. For the film grain block pattern dataset, assume a uniform block size of B×B. Different block sizes would help change the size of the film grain, but the same effect can be achieved by changing the frequency range for blocks of equal size. Therefore, to reduce the number of variables, the block size for film grain patterns can be set to a fixed size when implemented in hardware. Film grain block patterns can be generated using the same scheme described for the software implementation. FIG. 10 shows steps for generating the film grain value at a column C in row R (1050).

There is no explicit probability image in the hardware solution. Instead, there is a pseudo random number (PRN) sequence generator (1010-1015) for each row of the image. For each entry (pixel) in the row R, the PRN module generates a new random number. The PRNs can be seeded (1005) from a function of the row index and a random offset. If the random number is less than a threshold (1020) and there is enough room in the Noise Block Management Table (NBMT) (1090), then a film grain block (1070) from the set of film grain patterns (1030) is randomly selected to be inserted starting at this location (1065). The block is not added to the image straight away, but rather the system puts an entry (1025) of that block in the NBMT (1090). The NBMT-to-pixel-value logic block (1035) computes the noise value at the current location in the luma channel image (1045). For hardware implementation, the threshold Th is not normalized, thereby reducing computation cost. The non-normalized threshold is represented without the subscript "norm" in the symbol and it is related to the normalized threshold by the equation $Th=round(Th_{norm} \times 2^{B_i})$.

The reason for using pseudo random number generators from the previous rows, while computing the noise value at the current location, is one of efficiency. If B (noise block size) is significantly large, then reading/writing B rows on each pass would significantly add to memory Input/Output (I/O) and hardware cost by requiring B line buffers in the memory.

On the contrary, the present solution requires only one line buffer, irrespective of the block size. For a given location, there might be overlapping blocks from the previous rows. These blocks are shown by dashed squares (1070) in the image (1060) in FIG. 10. As the random seeds for each PRN generators are deterministic, the sequence of random numbers that the earlier rows went through can be reproduced. These sequences provide the exact locations of the blocks and block patterns used in the earlier rows. The information allows computation of the correct film grain values for any location with only one line buffer, thereby reducing the I/O latency and hardware costs. A noise block management table (990) is maintained for each row to keep track of the overlapping blocks.

Although the original and film grain infused luma channel row R is shown separately in FIG. 10, the original row R can be updated in-place to get the film grain infused row R.

The film grain block patterns are generated using the process similar to that described for a software-based solution. As the mechanism to compute these block patterns requires use of complex mathematical operations, this task can be handed over to the firmware. The synthesized blocks can be later stored in the on-chip SRAM for easy hardware access.

Another major challenge with hardware implementation is the random number generator. For faster implementation, a linear feedback shift register based pseudo random number generator can be used. Some bits in those random numbers are used to select the film grain block from the dataset of block patterns.

Figure 11:
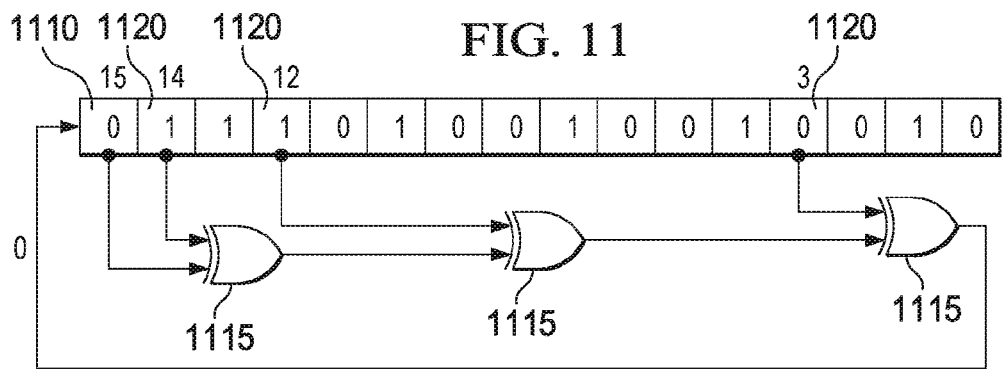
FIG. 11 shows, according to an embodiment, an example 16-bit register for use with the hardware implementation.

Linear feedback shift registers are commonly used to generate a sequence of random numbers in hardware chips. Consider the example 16-bit register shown in FIG. 11. The next random number is obtained by shifting the contents of the register to right by 1 and inserting a new bit at the most significant bit (MSB) location (1110). The new bit is the exclusive-OR (XOR) of bits at certain pre-defined locations (1120) in the register. For the example shown in FIG. 11, the bits at index locations 3, 12, 14, and 15 are XORed. The output of XOR gates (1115) is fed into the MSB location (1110).

If the locations of tap points are properly selected, the register goes through all the different 16-bit numbers once before returning to the same number. In other words, the sequence repeats itself after a certain period. It can be seen that the next random number is a function of the current state of the register. Therefore, care has to be taken to make sure that the register is not initialized to all zeros. For the all zero case, the process will get locked in that state.

The hardware implementation does not explicitly produce a probability image of H×W dimension. As a work-around, random numbers in each row can be generated using a linear feedback shift register. The shift register allotted to each row is initialized with a different random seed. This seed is a function of row index R and a random offset, $Seed_R$-(Const+R×Offset) mod 2D, where D is the length of the register. The random offset is derived from the current timestamp and the constant is set to any large number, like $2^{14}$ for a 16-bit shift register. The offset is randomly chosen but it is fixed for every row in the current frame. Though there is a different pseudo random number generator for each row, at any given point in time there are no more than B shift registers in the hardware. Here, B×B is the dimension of the block in block patterns dataset.

The seed is deterministic as the constant, offset and row index are known. The idea behind making this seed deterministic is to reproduce the sequence of random numbers that the earlier rows have gone through when dealing with the current row R. This allows determination of the locations of the overlapping film grain blocks from the earlier rows and using that knowledge to compute the film grain value for the current location.

Along with the random sequence generator, a table can be used to store the information about the location of blocks in the previous rows. This table is the called noise block management table (NBMT).

NBMT stores the information of the film grain blocks infused into the luma channel for the specific row. Every PRN sequence generator (see FIG. 10) has a corresponding NBMT. The number of entries in the table is a configurable parameter and every entry holds the following three columns, as shown in Table 1.

TABLE 1

| Noise Block Management Table | | |
| --- | --- | --- |
| Block ID | Location-x | Location-y |
| $b_i$ | $x_i$ | $y_i$ |

To compute the final value at each location, the system needs to consider all the blocks that overlap with that location. The noise block management tables keep track of these overlapping blocks, by storing the block id $b_i$, origin X-coordinate $x_i$ and origin Y-coordinate $y_i$ of the block in the image. For speed and computational efficiency, the maximum number of entries in the table is limited to $ceil(B/4)$.

For example, suppose the size of the film grain block pattern is B×B and the system is computing the film grain infused value at location (C,R) in the noise infused luma channel image, then the block originating at B−1 rows above or B−1 columns to the left can still influence the current location. For this reason, while processing the current row R, the system considers B−1 rows above it.

As illustrated in FIG. 10, the system initiates pseudo random number generators for B−1 rows above the current row R to find the overlapping blocks. The current row can also have its own random number generator denoted by PRN Row R. As the random seed is deterministic, the system can always reproduce the sequence that the earlier rows went through. Apart from a row specific random number generator, each of these B rows can also have its own NBMT.

Figure 12:
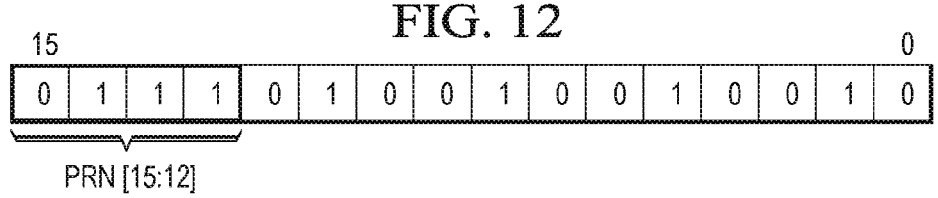
FIG. 12 shows, according to an embodiment, an example of how to pick block ID bits from pseudo random number generator.
Figure 13:
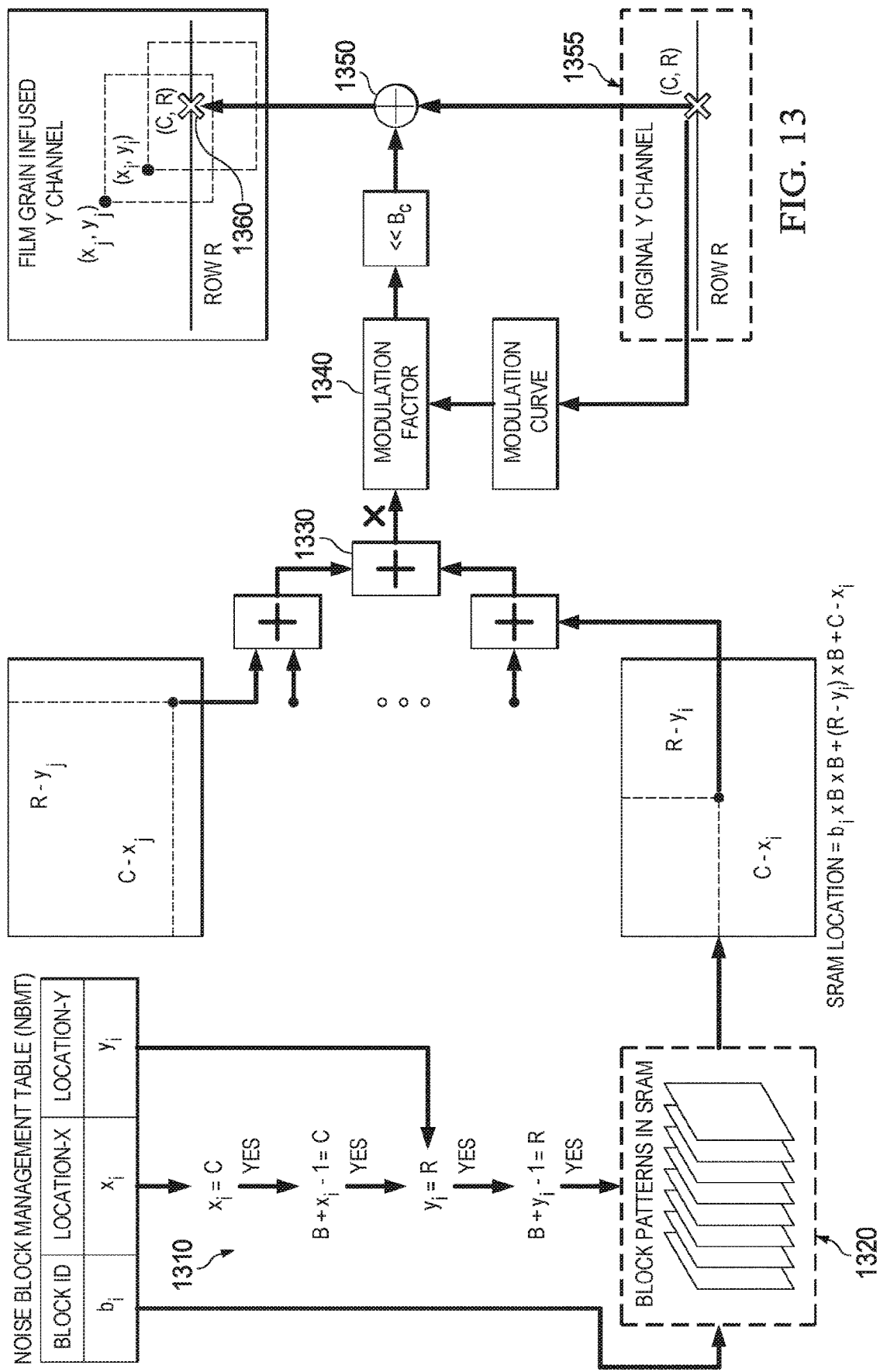
FIG. 13 shows, according to an embodiment, an example of NBMT to pixel value logic.

Let C represent the current column in row R being processed. Row R of the luma channel image is read into the line buffer. The column C is incremented from C=0 to C=W−1 in steps of 1. For each value of C the system can perform the following steps:

1. Each of the B random number generators produces a random number. If the number is greater or equal to the threshold Th, then do nothing.
2. Else if the random number is less than threshold then
   a. Remove any entry in NBMT that does not influence the current location. For example, a block size B×B with $x_i < C−B+1$ or $y_i < R−B+1$ is removed.
   b. Then if NBMT for that row is not full, a random block is selected from the film grain pattern dataset. Bits from that row's pseudo random number generator are used to select the block ID $b_i$. FIG. 12 presents an example of how to pick block ID bits from pseudo random number generator. For a dataset of 16 different block patterns, Block ID PRN[15:12]=7 refers to block ID 7, which is $7^{th}$ pattern in the dataset. The ordering start with index of 0.
   c. Entry for that block is added to the NBMT, with $x_i$=C and origin Y-coordinate equal to the row index. The block ID is derived from the previous step.
3. Compute film grain value at location (C,R) from NBMTs of all the R rows. This step is referred to as NBMT to pixel value logic, illustrated by example in FIG. 13.
   a. For each entry in every NBMT, check if the block overlaps with the current location (1310). The block overlaps when $x_i \leq C \leq B+x_i−1$ and $y_i \leq R \leq B+y_i−1$.
   b. Select the corresponding block from block pattern dataset (1320) using block ID extracted from PRN generator. Pick the value in the block that overlaps with the current location.
   c. There may be multiple such overlapping blocks, so the values are added together (1330).
   d. The value is handed over to the next stage that computes the luma modulation factor (1340) for the noise value. The luma modulated noise value is added (1350) to the original luma (1355) and written to line buffer at column C (1360).
4. Every row goes through this process, one at a time, to get the film grain infused luma channel image. For the rows that do not have B−1 rows above it, only the available rows are considered.

For a hardware-implemented luma intensity based noise modulation technique, the non-linear curves of the software-implementation should be replaced by piecewise linear segments to avoid wasting memory cycles on non-linear arithmetic. Parameters for these line segments can be signaled to the decoder in the metadata. The system can then compute the modulation factor for each luma intensity value from the piecewise linear curve.

Furthermore, the values in the curve for software implementation are fractional numbers. In the hardware, the fractional numbers are cumbersome to operate with. Therefore, values in the curve $$f(l) = 1 - \left(\frac{l/\beta}{2^{B_l}}\right)^\alpha$$

can be scaled to $B_c$=8-bit integers before piecewise linear approximation i.e. $f_{hw}(l)$=round($f(l) \times 2^{B_c}$) for $0 \leq l \leq 2^{B_l}−1$. The curve $f_{hw}(\bullet)$ is then partitioned into T segments using T+1 pivot points. Let the location of pivot points be represented by the vector $\Omega$, such that, $0 \leq \Omega(k) \leq 2^{Bis\ t}−1$ for $0 \leq k \leq T$.

For every two pivots on the curve, namely, $x1=\Omega(k)$ and $x2=\Omega(k+1)$, the system computes the equation of $k^{th}$ line segment that connects the points $y1=f_{hw}(x1)$ and $y2=f_{hw}(x2)$. The equation of the line has three parameters, slope, X-intercept (x1) and Y-intercept (y1).

$$\text{slope}_k = \frac{y2-y1}{x2-x1} \quad \text{equation 5}$$

$$y - y1 = \text{slope}_k \times (x - x1) \quad \text{equation 6}$$

Figure 14:
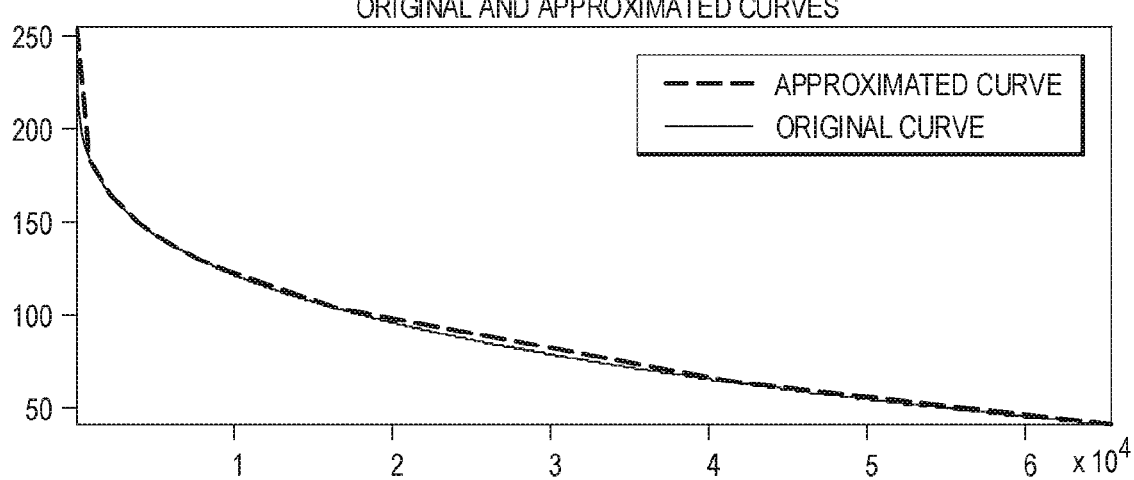
FIG. 14 shows, according to an embodiment, an example plot comparing a software based (original) vs. hardware based (piecewise linear) modulation curves.

Slope, pivots and Y intercept parameters for each segment are sent to the decoder. The curve is reconstructed at the decoder to compute the modulation factor for each luma intensity. For illustration, FIG. 14 plots the original (software based) and piecewise linear curve for $\alpha$=0.25, $\beta$=2. If $Y(C,R)=y_{CR}$ is the luma intensity at location (C,R) in the Y channel image, then noise value i.e. $n_{CR}$ is multiplied by $f(y_{CR})$ and added to the luma channel to get the noise infused luma value $\hat{Y}(C,R)=Y(C,R)+(n_{CR} \times f_{hw}(y_{CR})) >> B_c$. As the modulation factor is in $B_c$-bit codeword range, the product of film grain value and modulation factor can be right shifted by $B_c$-bits to get the correct luma modulated film grain value.

Similar to the film grain noise, hardware implementation of digital camera noise also has several restrictions.

1. Synthesizing Gaussian random numbers in hardware is expensive owing to the log function involved. As a work around, these numbers can be generated in firmware and stored as digital camera noise blocks.
2. Due to memory limitations, it is expensive to store the digital camera noise images in the on-chip memory. The noise pixel can be calculated and added to the Y, U and V channels directly after modulation.
3. Only a few rows of Y, U and V channels are read into the memory as line buffers for processing. As the image size can be huge, processing the entire image will be I/O and memory intensive. Line buffers will help ease the latency and memory requirements. But the architecture can be significantly altered to achieve similar result as the software solution.
4. Floating point arithmetic is more complex for hardware implementation, so all the values are converted to fixed point format. Some changes to the architecture are warranted when moving from floating point to fixed point arithmetic.
5. The block size for digital camera noise patterns can be fixed to 1×1 (B=1), which essentially means that the system is adding only one Gaussian random number at every location. This is in line with the software solution.

One embodiment of digital camera noise synthesis in hardware limits the block size for digital camera noise patterns to 1xi and the probability threshold for row R is set to $2^D$ while other rows have a threshold of zero. Setting the probability threshold to $2^D$ ensures that block is added to every pixel location in the Y channel. As the block size is restricted to 1xi, there is no overlap between blocks. Therefore, there is only one entry in the NMBT of row R.

Figure 15:
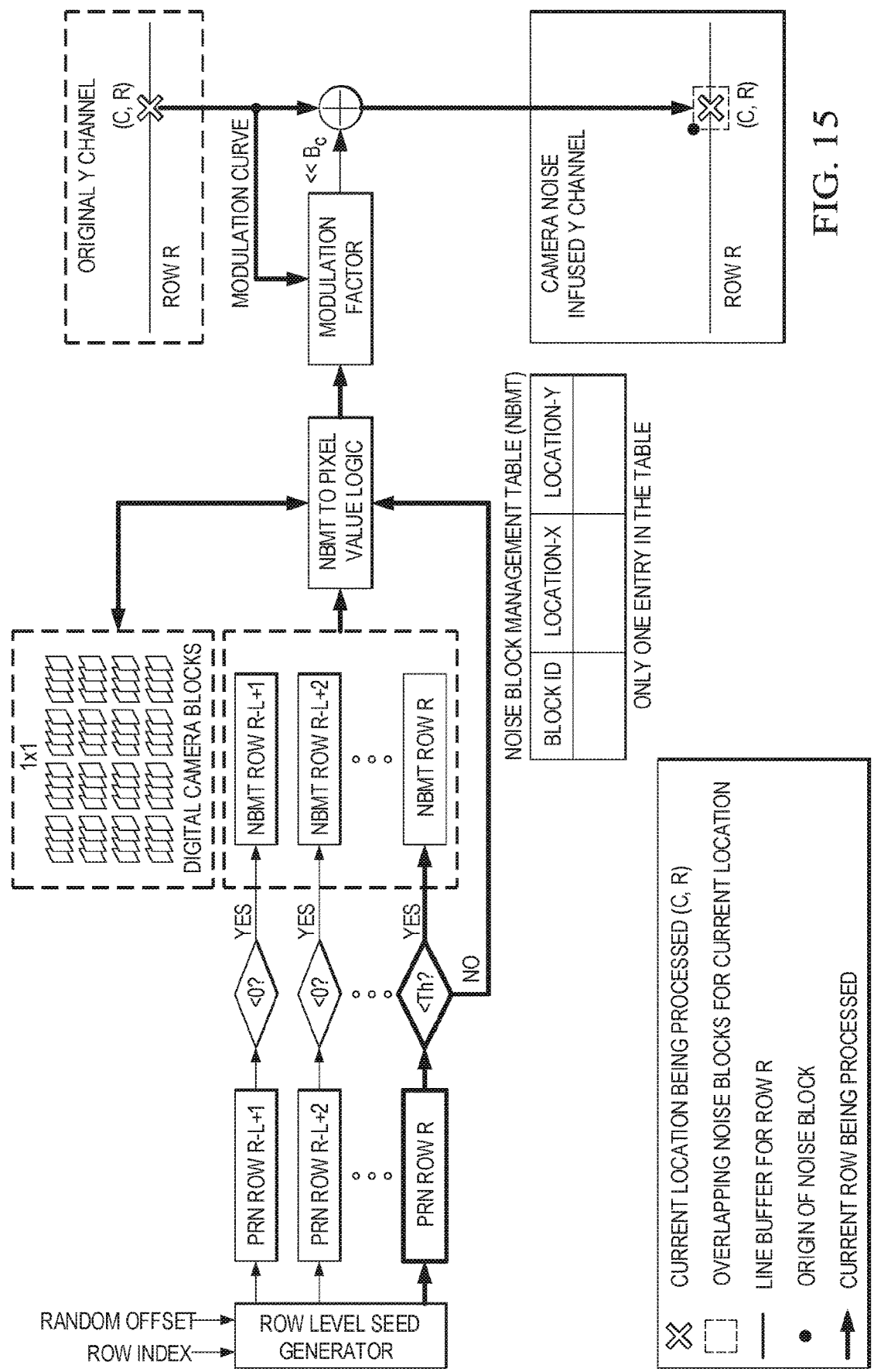
FIG. 15 shows, according to an embodiment, an example block diagram of hardware implementation of digital camera noise synthesis.

There is a pseudo random number generator for each row. While processing a row R and column C, if the pseudo random number is less than $2^D$ then the system adds a digital camera block to that pixel. As these random numbers are always less than $2^D$, the system adds Gaussian random number at each location. A block is randomly selected using the leading bits of the pseudo random number generator. The information of that block can be inserted in the NBMT of that row. NBMT to pixel value logic calculates the digital camera noise value. This value is modulated with the modulation factor and added to the column C of the line buffer. For blocks of size 1×1, B=1 and the NBMT to pixel value logic is straightforward as there is no overlap from neighboring blocks. FIG. 15 shows an example block diagram of hardware implementation of digital camera noise synthesis, which can be described as a special case of FIG. 10.

Figure 16:
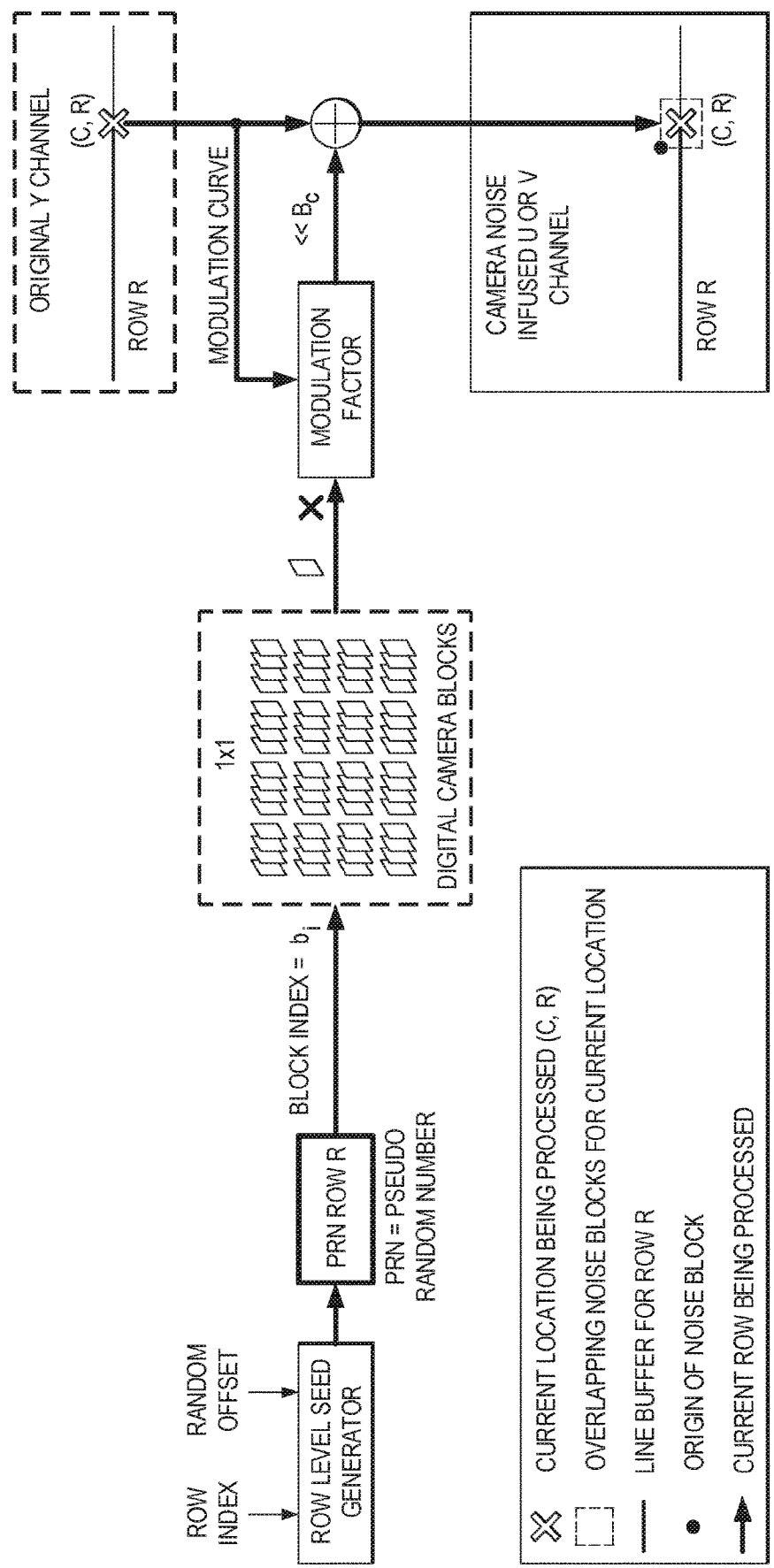
FIG. 16 shows, according to an embodiment, an example simplified camera noise synthesis system/method for chroma channels.

Digital camera noise is also added to chroma channels, as opposed to film grain which is only added to the luma channel. The architecture for camera noise injection into luma and chroma channels is essentially the same. The design for chroma channels can simplified by removing superfluous components like extra pseudo random number generators, threshold block, NBMTs and NBMT to pixel value logic etc. from hardware architecture of FIG. 15, as shown in the example of FIG. 16.

For an example, suppose there are 1024 block patterns for digital camera noise. Then the first 10-bits of the PRN Row R can be used to compute the block index $b_i$. The 1×1 block is picked from the dataset, modulated with luma intensity and added to the chroma channel line buffer at the current location.

For YUV 444 sequences, the modulation factors can be computed from collocated intensities in luma channel. The noise value is added to the chroma channels after modulation. In other words, the noise value is first modulated with the luma intensity and then added to the chroma channels.

For YUV 422 sequences, the Y channel can be subsampled to half in width and then modulation factors are computed from collocated pixels in Y channel. The noise value is modulated with the down sampled luma intensity and then added to the chroma channels. Down sampling using traditional filtering approach might be expensive for hardware. But modulation factor can work with a crude and approximate down sampling. To reduce hardware complexity, the luma channel is subsampled by simple averaging of neighboring elements in the row of luma channel. The process is elaborated in the following pseudo code. Symbol $Y_{hh}$ denotes the horizontally down sampled version of luma channel Y by taking average of neighboring elements in the same row.

Figure 17:
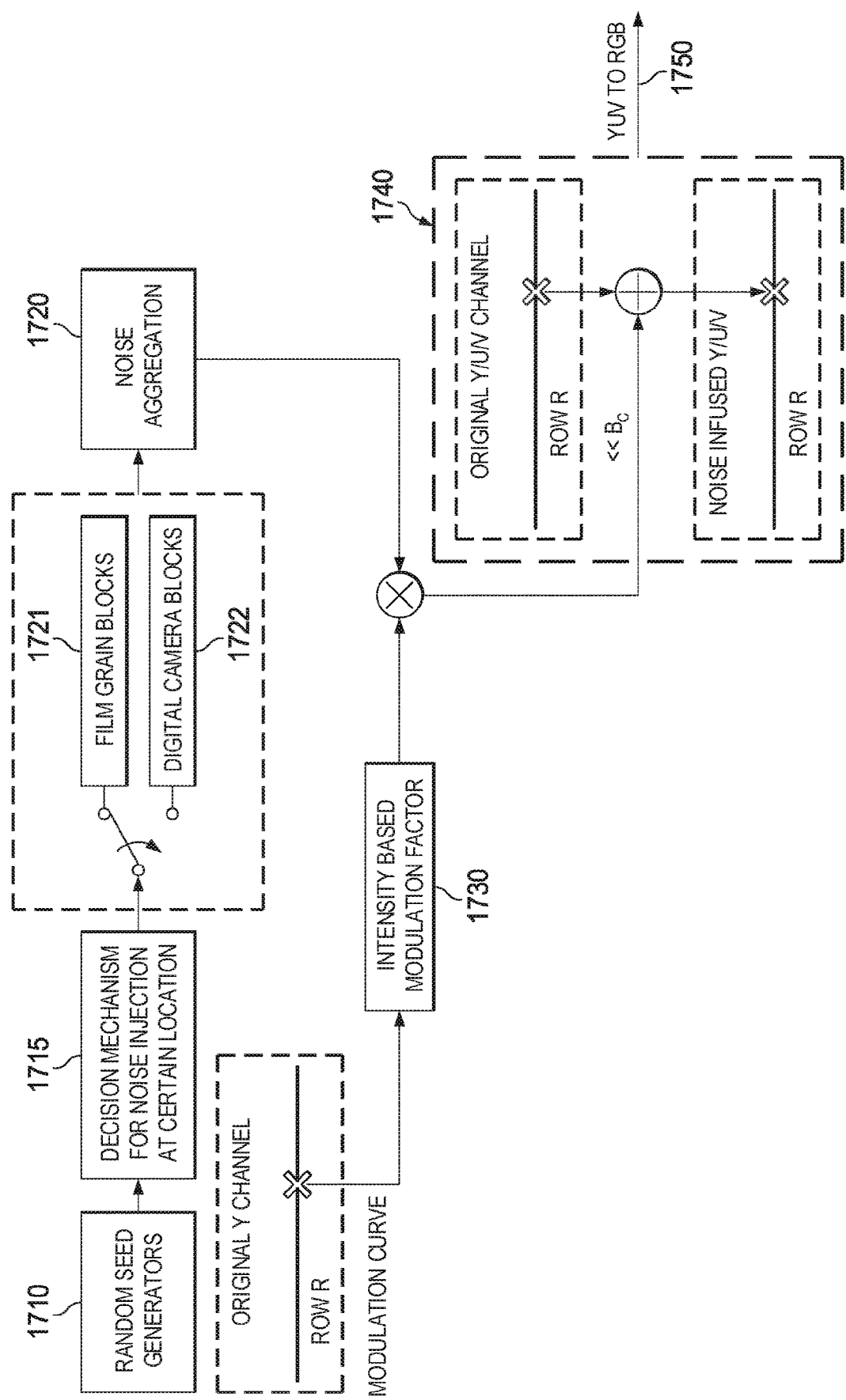
FIG. 17 shows, according to an embodiment, an example unified noise infusion architecture for the hardware implementation.

$Y_{hh} = 0_{H \times W/2}$ $i=0 \rightarrow H-1$ //vertical $j=0 \rightarrow W/2-1$ //horizontal $Y_{hh}(i,j)=(Y(i, 2j)+Y(i, 2j+1))>>1$ //middle is the average of left and right FIG. 17 shows an example unified noise infusion architecture for the hardware implementation, allowing synthesis of multiple types of noise (in this example, film grain and camera). The pseudo random number generators (1710) can produce a sequence of random numbers. If these random numbers satisfy the threshold condition, then aggregate noise value is computed (1720) using the film grain (1721) or digital camera noise (1722) block dataset, depending on what type of noise is determined to be needed (1715). The value is modulated (1730) with the luma intensity and added to the original luma or chroma channel. One row is processed at a time (1740), so the line buffer needs to be only big enough to accommodate a row of the YUV content. The noise infused YUV content is converted (1750) to RGB for display.

There are two different scenarios, wherein, the noise infusion model will be used to inject noise into the content. In the first scenario, the content provider can control the look of the noise to be added to the video. The parameters will be set at the encoder side and transmitted to the decoder as a part of the metadata. For the second scenario, the decoder can synthesize noise based on viewing conditions or display specifications. The content provider's settings can have higher priority over the local adjustments, or vice versa.

Noise synthesis parameters can be set at different stages of the workflow, namely, encoder-side content provider preferred settings or decoder-side locally adaptive settings. The decoder parameters can be configured into firmware or hardware.

For artistic reasons, the content provider might want to add film grain or camera noise to the video sequence for cinematic effect. The noise gets compressed while encoding and as a result, the cinematic effect is diminished at the decoder side. Moreover, a higher bit rate is required to compress noisy sequences, so sending a noise free sequence along with the parameters to generate the noise at the decoder side lowers the bit rate requirements and still preserves the cinematic effect. To that end, there is an option to set the parameters at the encoder-side and send them to the decoder through metadata. The parameters are listed in Table 2.

TABLE 2

Metadata Parameters

Noise Category
Block Size B × B
Number of Block Patterns Q
DCT Frequency Range [$f_s$, $f_e$]
Threshold Th
NBMT Table Entries
Noise Variance $\sigma_n^2$
Modulation Factor Curve The parameters can be read from the metadata to initialize the noise generation module at the decoder side. Likewise, the parameters can be adjusted at the decoder side based on the viewing environment or display specifications. Either way, decoder has to synthesize the noise given a set of parameters. The decoder consists of firmware or processor and hardware system. The firmware can compute complex mathematical functions at cost of speed, but hardware can perform low-level logical operations at faster rate.

Based on speed requirements and computational complexity, the task of noise image generation has to be split into firmware and hardware. Synthesizing film grain or camera noise blocks is computationally intensive for hardware, so it can be handed over to the firmware. There are only a few block patterns to build, so the firmware can easily build those during system boot up without much processing overhead.

EXAMPLE EMBODIMENTS

EE1. A computer-based method for creating a synthesized noise image for a digital image, the method comprising: providing a plurality of noise block patterns; initializing a noise image; generating a probability image comprising randomly generated probability values at each pixel of the probability image, comparing each probability value in the probability image with a threshold criterion; if the probability value satisfies the threshold criterion, selecting a noise block pattern from the plurality of noise block patterns, the noise block pattern having an anchor point; and if the probability value satisfies the threshold criterion, creating synthesized noise image by placing the noise block pattern in the noise image such that the anchor point corresponds to a pixel in the probability image that meets the threshold criterion.

EE2. The method of EE1, wherein the noise grain block patterns are selected randomly.

EE3. The method of EE1 or EE2, wherein the probability values of the probability image are uniformly distributed probability values.

EE4. The method of any one of EE1-EE3, wherein the noise block patterns comprise film grain block patterns.

EE5. The method of any one of EE1-EE4, further comprising aggregating values in regions of the noise image where the noise block patterns overlap.

EE6. The method of any one of EE1-EE5, further comprising generating the noise block patterns before generating the noise image, wherein the noise block patterns are generated through an inverse DCT technique.

EE7. The method of EE6, wherein the generating further comprises removing low frequency DCT coefficients.

EE8. The method of EE6 or EE7, wherein the generating further comprises removing high frequency DCT coefficients.

EE9. The method of any one of EE1-EE8, wherein the probability image and the noise image are sized to match a video frame.

EE10. The method of any one of EE1-EE9, further comprising: editing a content image by adding the noise image to a channel of the content image.

EE11. The method of EE10, further comprising: multiplying values in the noise image by a modulation factor before adding the noise image to the content image.

EE12. The method of EE11, wherein the values are luma intensity values of the noise image.

EE13. The method of any one of EE10-EE12, further comprising: generating a YUV content image based on the edited content image.

EE14. The method of EE13, further comprising: generating an RGB content image based on the YUV content image.

EE15. A device comprising: a decoder decoding an encoded image, creating a decoded clean sequence; a noise synthesis module performing the method of any one of EE1-EE14, creating a synthesized noise image; wherein the decoder is configured to combine the synthesized noise image with the decoded clean sequence, creating a rendered image for display.

EE16. The device of EE15, further comprising a modulation curve module for modulating the synthesized noise image prior to combining with the decoded clean sequence.

EE17. A computer program product comprising data encoded to perform the method of any one of EE1-EE14 when run on a processor.

EE18. A device for creating synthesized noise in an image, the device comprising: a line buffer comprising a row from the image; firmware comprising noise block patterns; a pseudo random number generator providing a random value for a pixel in the row; logic for comparing the random value with a threshold criterion; data store comprising a noise block management table; logic populating the noise block management table based on a random noise block pattern from the firmware being associated with a pixel in the row where the random value associated with the pixel meets the threshold criterion; logic computing a noise value for each pixel location in the row of the image based on the noise block management table; and logic modifying the row based on the noise value.

EE19. The device of EE18, further comprising: logic for determining a modulation curve from the image, computing a modulation factor, and applying the modulation factor to the noise value prior to modifying the row.

EE20. The device of EE18 or EE19, wherein the pseudo random noise generator generates random numbers based on the row index and a random offset value.

EE21. The device of any one of EE18-EE20, wherein the image is a luma channel image.

EE22. The device of any one of EE18-EE20, wherein the image is a chroma channel image.

EE23. The device of any one of EE18-EE22, further comprising multiple pseudo random number generators and multiple line buffers processing the image in parallel.

EE24. A decoder system comprising a decoder decoding an encoded image, creating a decoded clean sequence; a noise synthesis module comprising the device of any one of EE18-EE23, creating a synthesized noise image; wherein the decoder is configured to combine the synthesized noise image with the decoded clean sequence, creating a rendered image for display.

EE25. A method for generating metadata for a decoder, the method comprising: setting a noise category parameter; setting a block size parameter; setting a threshold parameter; and setting a modulation factor curve parameter.

EE26. The method of EE25, further comprising setting a noise variance parameter.

EE27. The method of any one of EE25 or EE26, further comprising setting a discrete cosine transform frequency range parameter.

EE28. The method of any one of EE25-EE27, further comprising setting a number of block patterns parameter.

EE29. The method of any one of EE25-EE28, further comprising setting a noise block management table entries parameter.

A number of embodiments of the disclosure have been described. Nevertheless, it will be understood that various modifications may be made without departing from the spirit and scope of the present disclosure. Accordingly, other embodiments are within the scope of the following claims. Any significant features of the embodiments are common to all embodiments where appropriate.

The examples set forth above are provided to those of ordinary skill in the art as a complete disclosure and description of how to make and use the embodiments of the disclosure and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The invention claimed is:

1. A computer-based method for creating a synthesized noise image for a digital image, the method comprising:
    providing a plurality of noise block patterns;
    initializing a noise image;
    generating a probability image comprising randomly generated probability values at each pixel of the probability image,
    comparing each probability value in the probability image with a threshold criterion;
    if the probability value satisfies the threshold criterion, selecting a noise block pattern from the plurality of noise block patterns, the noise block pattern having an anchor point; and
    if the probability value satisfies the threshold criterion, creating synthesized noise image by placing the noise block pattern in the noise image such that the anchor point corresponds to a pixel in the probability image that meets the threshold criterion.

2. The method of claim 1, wherein the noise block patterns are selected randomly.

3. The method of claim 1, wherein the probability values of the probability image are uniformly distributed probability values.

4. The method of claim 1, wherein the noise block patterns comprise film grain block patterns.

5. The method of claim 1, further comprising aggregating values in regions of the noise image where the noise block patterns overlap.

6. The method of claim 1, further comprising generating the noise block patterns before generating the noise image, wherein the noise block patterns are generated through an inverse DCT technique.

7. The method of claim 6, wherein the generating further comprises removing low frequency DCT coefficients.

8. The method of claim 6, wherein the generating further comprises removing high frequency DCT coefficients.

9. The method of claim 1, wherein the probability image and the noise image are sized to match a video frame.

10. The method of claim 1, further comprising: editing a content image by adding the noise image to a channel of the content image.

11. The method of claim 10, further comprising: multiplying values in the noise image by a modulation factor before adding the noise image to the content image.

12. The method of claim 11, wherein the values in the noise image are luma intensity values of the noise image.

13. The method of claim 10, further comprising: generating a YUV content image based on the edited content image.

14. The method of claim 13, further comprising: generating an RGB content image based on the YUV content image.

15. A device comprising:
    a decoder for decoding an encoded image, for creating a decoded clean sequence;
    a noise synthesis module for performing the method of claim 1, for creating a synthesized noise image;
    wherein the decoder is configured to combine the synthesized noise image with the decoded clean sequence, for creating a rendered image for display.

16. The device of claim 15, further comprising a modulation curve module for modulating the synthesized noise image prior to combining with the decoded clean sequence.

17. A non-transitory computer-readable storage medium having stored thereon computer-executable instructions for executing with one or more processors a method in accordance with claim 1.

18. A device for creating synthesized noise in an image, the device comprising:
    a line buffer comprising a row from the image;
    firmware comprising noise block patterns;
    a pseudo random number generator for providing a random value for a pixel in the row;
    logic for comparing the random value with a threshold criterion;
    data storage comprising a noise block management table;
    logic for populating the noise block management table based on a random noise block pattern from the firmware being associated with a pixel in the row where the random value associated with the pixel meets the threshold criterion;
    logic for computing a noise value for each pixel location in the row of the image based on the noise block management table; and
    logic for modifying the row based on the noise value.

19. The device of claim 18, further comprising: logic for determining a modulation curve from the image, computing a modulation factor, and applying the modulation factor to the noise value prior to modifying the row.

20. The device of claim 18, wherein the pseudo random noise generator generates random numbers based on a row index and a random offset value.

21. The device of claim 18, wherein the image is a luma channel image.

22. The device of claim 18, wherein the image is a chroma channel image.

23. The device of claim 18, further comprising multiple pseudo random number generators and multiple line buffers for processing the image in parallel.

24. A decoder system comprising:
    a decoder for decoding an encoded image, for creating a decoded clean sequence;
    a noise synthesis module comprising the device of claim 18, for creating a synthesized noise image;
    wherein the decoder is configured to combine the synthesized noise image with the decoded clean sequence, for creating a rendered image for display.

* * * * *